Nov. 16, 1943.　　　　G. E. FLINN　　　　2,334,402
TRANSMISSION CONTROL
Filed Dec. 13, 1941　　　4 Sheets-Sheet 1

Inventor:
George E. Flinn
By Edward C. Fitzhugh
Atty

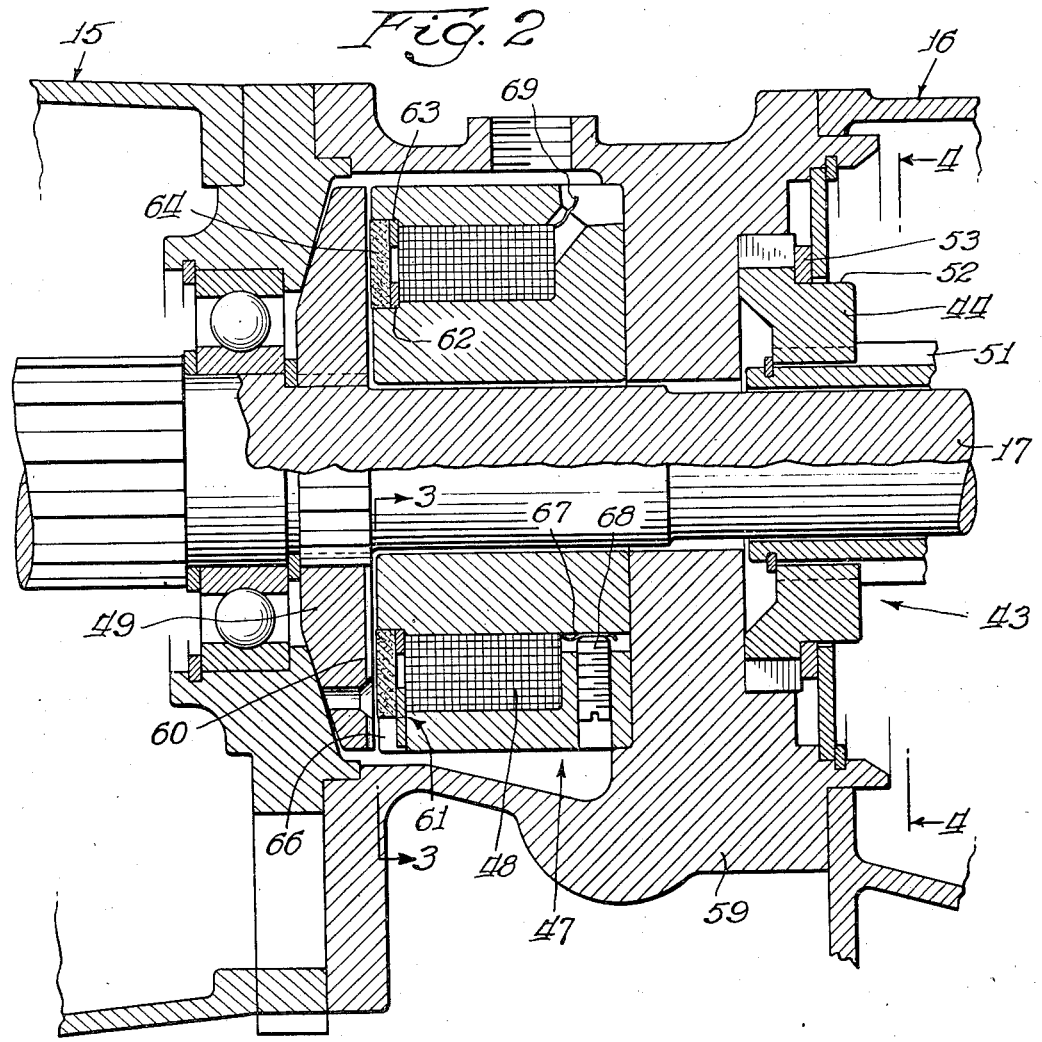
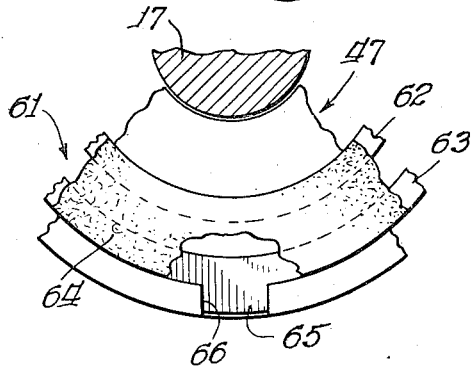

Inventor:
George E. Flinn

Nov. 16, 1943.   G. E. FLINN   2,334,402
TRANSMISSION CONTROL
Filed Dec. 13, 1941   4 Sheets-Sheet 4

Inventor:
George E. Flinn
By Edward C. Gritzbaugh
Atty.

Patented Nov. 16, 1943

2,334,402

UNITED STATES PATENT OFFICE 2,334,402

TRANSMISSION CONTROL

George E. Flinn, Muncie, Ind., assignor to Borg-Warner Corporation, Chicago, Ill., a corporation of Illinois Application December 13, 1941, Serial No. 422,805

22 Claims. (Cl. 74—328)

This invention relates to transmissions and particularly to a control means for a change speed transmission.

This invention is particularly well adapted for use with an automatic transmission of the type described in a copending application of J. M. Simpson et al., Serial No. 403,196, filed July 19, 1941, and is in the nature of an improvement over the Simpson et al. transmission.

In the above Simpson et al. application a combination countershaft type transmission and planetary type transmission is disclosed with means for automatically effecting shifts through the countershaft and planetary transmissions in a coordinated manner to secure a plurality of forward speed ratios. The two types of transmissions are so arranged that an intermediate shaft is required for connecting the two transmissions together, with automatically releasable clutching means, such as free wheeling clutches, for connecting the intermediate shaft to the driving and driven shafts. Positively interengageable elements are provided for effecting a change in ratio between the intermediate shaft and driven shaft, the elements being dependent upon a relative reversal of direction of rotation in order to effect the engagement thereof. Since the intermediate shaft is automatically disengaged from the drive and driven shafts, it has a tendency to float with the driven shaft and thereby delay the establishment of the requisite change in direction of rotation for engaging the positively interengageable elements.

The solution to this problem previously proposed comprised reversing the construction of the interengageable elements so that they may be engaged without requiring a reversal in the direction of rotation of one of the elements. Along with this construction automatic means were provided for delaying the operation of the elements for a predetermined time interval to prevent undue clash. It is sometimes desirable, however, to accelerate the shift rather than delay it, as for example, in an emergency where a quick get away is desired, and in such situations the construction disclosed in the prior Simpson et al. application would not be satisfactory.

The principal object of this invention is to provide a control device for positively interengageable elements which device may be operated automatically to accelerate the engagement of the elements.

A more specific object of this invention is to provide a means, in a transmission having a floating shaft which controls the speed of one of two or more interengageable elements, for rapidly decelerating the shaft automatically in order to bring about a reversal in the direction of rotation of the interengageable elements and thereby to facilitate their engagement.

Another object of this invention is to provide a two unit transmission wherein a countershaft type transmission is employed as one of the units and an overdrive transmission is employed as the other unit, with an inter-connecting floating shaft and with automatically operated brake means for the intermediate shaft for slowing down and then reversing the direction of rotation of the sun gear in order to effect more rapidly a shift from direct drive through the overdrive transmission to an overdrive.

Another object of this invention is to provide a novel electro-magnetic brake for controlling the time of shifts of an overdrive transmission.

Still another object is to provide several modifications of an electro-magnetic brake which would be suitable for the purpose intended.

These and other objects and features of this invention will become apparent from the following description when taken together with the accompanying drawings in which:

Fig. 2 is an enlarged section through the novel control mechanism;

Fig. 3 is a fragmentary front elevation taken along lines 3—3 of Fig. 2;

Figure 1:
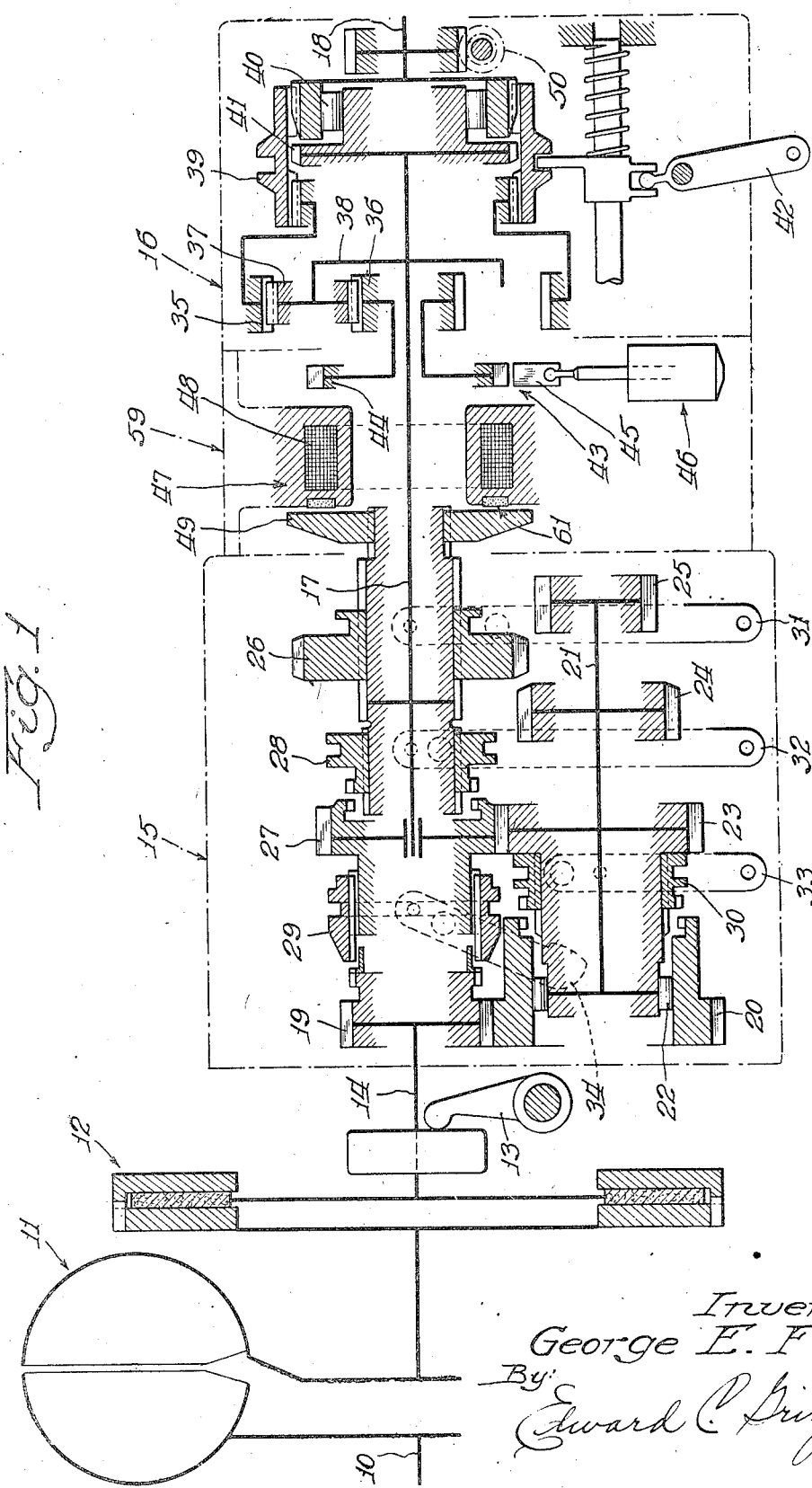
Fig. 1 is a diagrammatic elevation in section of an automatic transmission showing the control means of this invention applied thereto.

Referring now to the drawings for a detailed description of the invention, Fig. 1 shows schematically, a transmission of the type to which this invention is particularly adaptable. It is comprised of a drive shaft 10 which is driven by a prime mover such as an internal combustion engine, a hydraulic coupling 11 driven by drive shaft 10, a friction clutch 12 driven by coupling 11 and manually releasable by the usual clutch release lever 13, and an input shaft 14 which connects the clutch 12 to a countershaft type unit 15. A planetary type variable speed unit 16 is driven from countershaft unit 15 by means of an intermediate shaft 17. The output or driven shaft of the planetary unit 16 is shown at 18.

Countershaft unit 15 is comprised of an input gear 19 which is directly connected to shaft 14 and meshes with a gear 20 connected to a countershaft 21 by means of an overrunning clutch 22. On said countershaft 21 are drivingly mounted a second speed gear 23, a first speed gear 24 and a reverse gear 25. A sliding gear 26 is splined on intermediate shaft 17 and adapted to engage low speed gear 24 to provide a low speed drive through the countershaft unit. Said sliding gear 26 when in the position shown disconnects the low speed drive and makes possible a neutral condition in the countershaft unit. When gear 26 is slid to the right it engages an idler (not shown) which in turn meshes with reverse gear 25 and thereby establishes a reverse drive in intermediate shaft 17.

Meshing with second speed gear 23 is a gear 27 which is loosely mounted on intermediate shaft 17. A slidable jaw clutch 28 is provided for connecting gear 27 to intermediate shaft 17 to provide a second speed drive through the countershaft unit. A second jaw clutch 29 serves to connect gear 27 to gear 19 for direct drive. Said clutch 29 provides a positive two-way connection between the gears 19 and 27. Thus when clutches 28 and 29 are engaged and sliding gear 26 is in the position shown (neutral) a direct drive is established through countershaft unit 15.

In order that the engine may be used as a brake while the countershaft unit 15 is conditioned for second speed drive, a lock-up clutch 30 is provided which substitutes a two-way drive between gear 20 and countershaft 21 for the overrunning clutch drive 22. When clutch 30 is disengaged, however, intermediate shaft 17 is not connected to drive shaft 14 and hence will not be decelerated with the engine.

Suitable levers are provided for operating the various clutches as follows: lever 31 controls sliding gear 26, lever 32 controls jaw clutch 28, lever 33 controls second speed lock-up clutch 30 and lever 34 controls direct drive clutch 29. Each of these levers may be manually operated, or, alternatively, may be operated automatically as described in the aforesaid Simpson et al. application.

For purposes of illustration, planetary unit 16 is shown comprised of a commercially available overdrive unit such as is generally attached to the output shaft of a standard transmission. The overdrive is comprised of a planetary gear set having a ring gear 35, a sun gear 36 and a plurality of planet pinions 37 meshing with sun gear 36 and ring gear 35. Planet pinions 37 are mounted on a carrier 38 which is connected directly to intermediate shaft 17 and is rotatable therewith. Ring gear 35 is connected by means of a clutch 39 to driven shaft 18. A direct drive between intermediate shaft 17 and driven shaft 18 is provided by means of a releasable clutch 40 which may be of the cam-and-roller type such that it is automatically releasable upon a reversal of driving relations between the shafts. A lock-up clutch 41 is provided to prevent a release of clutch 40 when it is desired to coast against the engine. Clutch 39 is controlled by a lever and yoke mechanism 42.

Sun gear 36 is connected to an automatically controlled brake 43. Said brake 43 is comprised of a slotted member 44 which is connected to rotate with sun gear 36 and a radially slidable pawl 45 controlled by an electromagnet 46 and engageable with slotted member 44 to arrest the rotation of sun gear 36.

It should be noted at this point that in order for pawl 45 to engage slotted member 44, the latter must come to rest and in fact begin to rotate reversely, due to the particular construction of the pawl as will be described hereinafter in connection with Fig. 4. Normally this slight reversal in the direction of rotation of slotted member 44 is brought about by slowing down the drive shaft 10 as for example by release of the accelerator pedal. If the shift from direct drive to overdrive in planetary unit 16 is to be effected while countershaft unit 15 is conditioned for second speed operation through overrunning clutch 22, releasing the accelerator will not necessarily cause intermediate shaft 17 to decelerate since the latter is then disconnected from drive shaft 10 because of the free wheeling action of overruning clutch 22. Shaft 17 therefore will tend to float and rotate at a constantly decreasing speed, the rate of deceleration being much lower than the rate of deceleration of drive shaft 10. Under these conditions it would take much longer to effect an overdrive than would be desirable. In the construction shown in the aforementioned Simpson et al. application this condition was alleviated by changing the chamfer of the pawl so that it could be engaged with the slotted member before the latter came to rest. To avoid tooth clash, the radial inward movement of the pawl was delayed electrically for a predetermined time to give the slotted member a chance to slow down. This however, involved a change in the standard construction of the overdrive and also involved the use of a time delay device, the action of which was difficult to control accurately and which under certain circumstances did not operate quickly enough to suit the driver's needs.

In accordance with the present invention, a standard pawl and slotted member construction is used, but an additional brake mechanism 47 is operatively connected with intermediate shaft 17 to decrease the amount of time required to bring slotted member 44 to rest and to rotate it in a reverse direction. In the form shown, brake 47 is comprised of a fixed coil 48 surrounding intermediate shaft 17, and a disc-shaped armature 49 likewise surrounding intermediate shaft 17, but splined to said shaft 17 so that the two will rotate together. Brake 47 and electromagnet 46 are both controlled by a governor 50 which is driven from driven shaft 18. It will be observed that if brake 47 is conditioned for operation at the same time that solenoid 46 is conditioned to move pawl 45 radially inward, shaft 17 will slow down carrier 38 and sun gear 36 will therefore slow down at a still greater rate so that it will soon stop and begin to rotate in a reverse direction thereby bringing about the conditions under which sun gear brake 43 may become effective.

Figure 4:
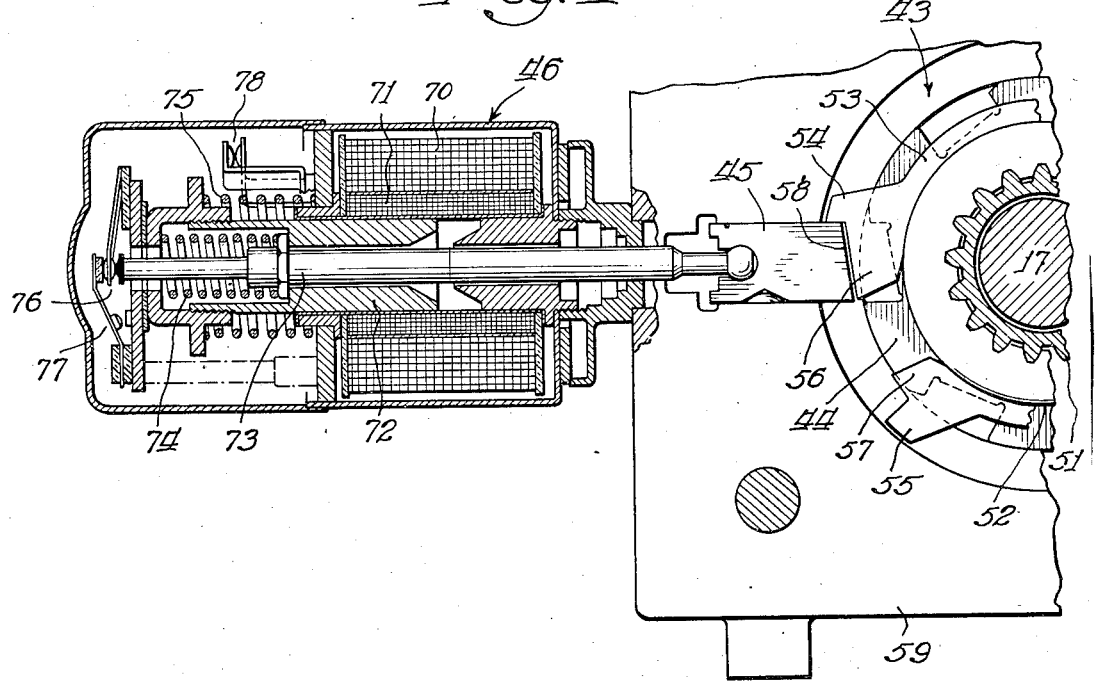
Fig. 4 is a section through the control means for the overdrive transmission.

Referring now to Figs. 2 and 4 for a detailed description of the sun gear brake 43, the sun gear 36 is provided with a sleeve 51 to which is splined the slotted member 44. Said slotted member 44 is provided with a shoulder 52 on which is mounted frictionally a balk ring 53, said balk ring being provided with lugs 54 and 55 which are adapted to engage the sides of pawl 45. The lugs 54 and 55 are provided with shoulders 56 and 57 respectively, which extend into the path of movement of pawl 45 depending upon the direction of rotation of sun gear 36. The end 58 of pawl 45 is chamfered to prevent pawl 45 from engaging slotted member 44 while the latter is rotating in a forward direction.

It is apparent that pawl 45 cannot engage slotted member 44 until the direction of rotation of sun gear 36 has been reversed in order to rotate balk ring 53 out of the way of the pawl. It is to accelerate this reversal of rotation that brake 47 is provided.

Brake 47 is preferably located within an adaptor 59 inserted between units 15 and 16. The brake itself, as stated above, is comprised of a coil 48 fixed to adaptor 59 and an armature 49 splined to intermediate shaft 17. Armature 49 is preferably provided with radial grooves 60 which serve partly to increase the unit pressure on the armature and partly to receive and remove chips or filings which would otherwise score the surface of the armature. Intermediate armature 49 and coil 48 is a friction disc 61 which is shown in partial elevation in Fig. 3. Said disc is comprised of a pair of washers 62 and 63 to which is bonded a friction material 64 which is similar to that used on standard friction clutches. Washer 63 is provided with lugs 65 which extend into slots 66 in the housing of coil 48 so as to be held against rotation therein. One lead 67 of the coil 48 may be grounded by means of a screw 68 as shown in Fig. 2 and the other lead 69 is connected to a control circuit as shown in Fig. 7 hereinafter to be described.

The electromagnet 46 which controls pawl 45 is shown in detail in Fig. 4. It is comprised of an actuating coil 70, a holding coil 71, an armature 72 and a pawl rod 73 which is connected to armature 72 by means of a spring 74. A retractile spring 75 normally holds armature 72 and the associated rod 73 in retracted position. A switch 78 controls the circuit to the actuating coil 70, a switch 77 controls the usual downshift or kick-down circuit (not shown) and a third switch 76 controls the effectiveness of brake 47. Switches 76 and 78 are made when pawl 45 is in its retracted position and break their respective circuits when the pawl moves into engagement with slotted member 44. Switch 76 is completely insulated from its support so that it may be used in series with other switches.

Figure 7:
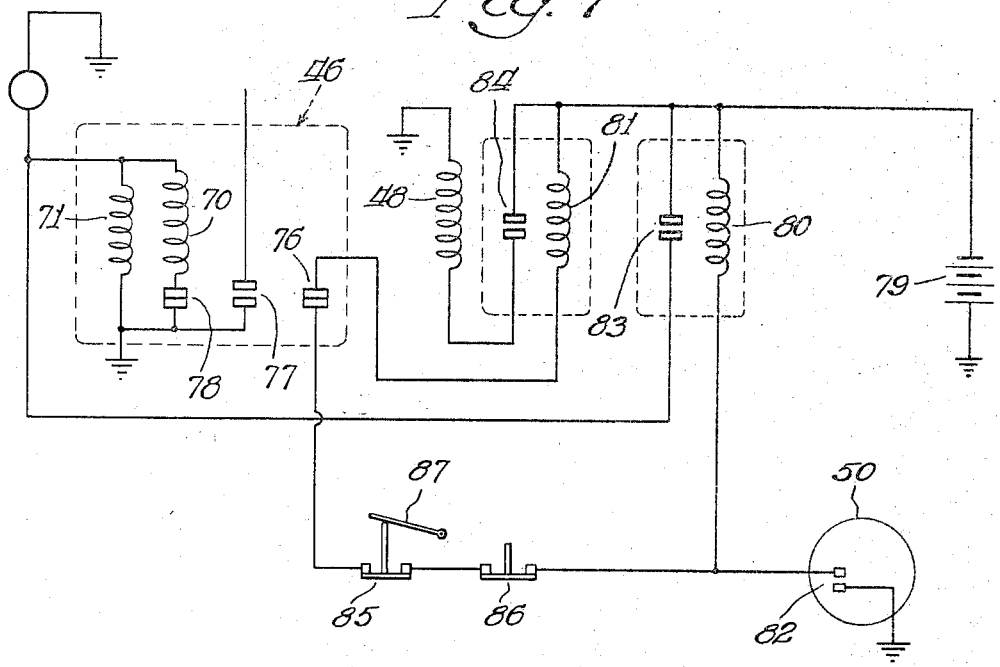
Fig. 7 is a wiring diagram showing how this invention may be connected to operate with an overdrive transmission.

The circuits through the overdrive and brake are shown in Fig. 7. A battery 79 or other source of electrical energy is connected on one side to ground and on the other to a pair of relays 80 and 81 connected in parallel and thence to governor 50 in which is a speed controlled switch 82 which may be set to complete a circuit therethrough at approximately 23 M. P. H. vehicle speed. Relay 80 is the overdrive relay and is provided with a pair of normally opened contacts 83 which are adapted to connect battery 79 with actuating coil 70 and holding coil 71 of the overdrive electromagnets. Relay 81 is the brake relay and is provided with a pair of normally opened contacts 84 which when closed completes a circuit from battery 79 through electromagnet 48 of brake 47. In series with relay 81 is the switch 76 which it will be remembered is normally made and is broken when pawl 45 moves into engagement with slotted member 44, a throttle operated switch 85 and a third switch 86 which is operated by the movement of shift lever 34 which controls the jaw clutch 29 to provide either direct drive or second speed drive. Switch 86 is normally closed when jaw clutch 29 is in its second speed position and is opened when jaw clutch 29 is in direct drive position. Throttle switch 85 is normally closed when throttle lever 87 moves from fully closed to approximately one-quarter open position and is thereafter opened.

The operation of the control circuit is as follows:

Assume that countershaft unit 15 is set for second speed drive and that the vehicle is moving at less than 23 M. P. H. which is the cut-in speed of governor switch 82. Assume also that throttle lever 87 has been moved to more than one-quarter throttle setting. Under these conditions switches 76, 78 and 86 will be closed and switches 83, 84, 85 and 82 will be opened. When a speed of 23 M. P. H. is reached, governor switch 82 will close, thereby energizing relay 80 and closing the contacts of switch 83 which in turn energizes solenoid 70 and holding coil 71. Armature 72 will compress spring 74 but pawl 45 will not move into engagement because shoulder 56 of balk ring 53 obstructs such movement. Since throttle switch 85 is open, brake relay 81 will not be energized and hence the brake will not be applied. When the operator releases accelerator pedal 87 to one-quarter throttle setting or less, the engine will tend to slow down and at the same time switch 85 is closed which completes the circuit through brake relay 81 and closes the contacts of switch 84, thereby energizing brake electromagnet 48 to apply the brake. With brake 47 applied, intermediate shaft 17 will immediately slow down and at some point in the slowing down, a speed differential will be established between intermediate shaft 17 and output shaft 18 which is such as to cause sun gear 36 to stop and begin to rotate in the opposite direction. When this occurs, balk ring 53 will be moved in the opposite direction and shoulder 56 will move out of the path of pawl 45. The latter having been energized by the compression of spring 74 will instantly move toward engagement with slotted member 44, and since said slotted member 44 is rotating slowly in the opposite direction, pawl 45 will move into the first slot that presents itself. The inward movement of pawl 45 causes switch 76 to open its contacts and break the circuit through brake relay 81 thereby deenergizing this relay and its associated brake electromagnet 48. Upon reopening the throttle by means of pedal 87 switch 85 is again opened but it has no further effect upon the circuit until pawl 45 is again withdrawn to reestablish the circuit through switch 76. The transmission will then be in second overdrive ratio.

It will be observed that should countershaft unit 15 be conditioned for direct drive before planetary unit 16 is conditioned for overdrive, the automatically releasable connection between intermediate shafts 17 and input shaft 14 is no longer effective and a two-way drive connection is provided between these shafts by means of jaw clutch 29. Under these conditions intermediate shaft 17 will be quickly decelerated by the engine because of the connection thereto through clutch 12 and hydraulic coupling 11. Under these conditions therefore, there is no need for any braking action to be applied to intermediate shaft 17 in order to facilitate the engagement of pawl 45 with slotted member 44. For this reason switch 86 is provided which breaks the circuit through brake relay 81 whenever jaw clutch 29 is operated to connect shaft 17 to input shaft 14. This switch however has no effect upon the overdrive control circuit and it is possible to shift from direct drive through both units 15 and 16 to overdrive whenever the governor switch 82 is operated.

Figure 5:
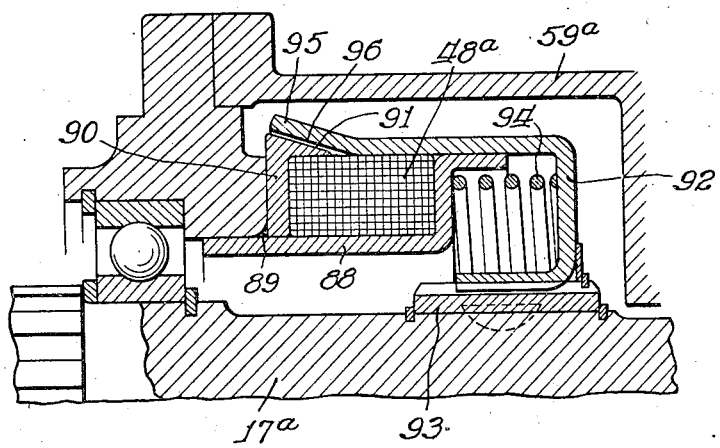
Figs. 5 and 6 are elevations in section of two modifications of this invention.

A modification of the brake is shown in Fig. 5. This modification is mounted in an adaptor 59a and is provided with a coil 48a mounted in a stamping 88 which is welded as at 89 to the rear wall of countershaft unit 15. A fixed friction plate 90 is mounted between coil 48a and the rear wall and is provided with a conical friction surface 91 on the outer periphery thereof. An armature 92 in the form of a stamping is splined to a sleeve 93 which in turn is keyed to shaft 17a so as to rotate therewith. A spring 94 normally keeps armature 92 separated from coil 48a. Said armature 92 is flared at its open end 95 to provide a complementary conical surface 96 for conical surface 91 on plate 90. This form of brake may be used where a cheaper construction is necessary and considerable holding power is required.

Figure 6:
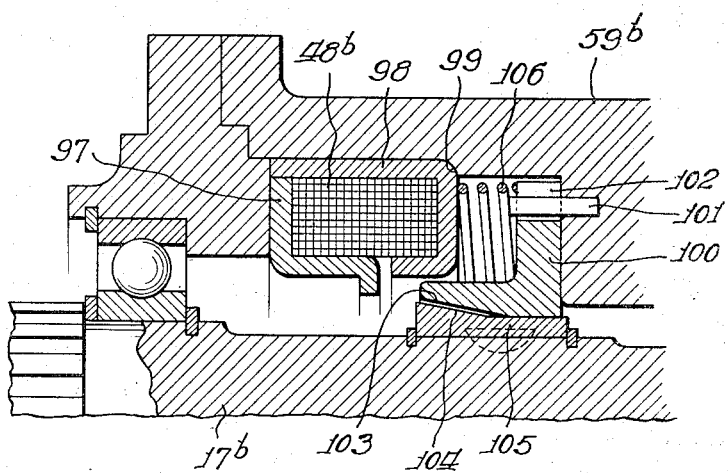

Another modification of the brake is shown in Fig. 6. This form is somewhat similar to the form shown in Fig. 5 but is provided with a smaller conical friction surface. The brake mechanism is mounted in an adaptor 59b and cooperates with a shaft 17b to arrest the rotation of the latter. The brake itself is comprised of a coil 48b which is mounted in a two-part stamping 97, 98 held in adaptor 59b by a shoulder 99 in said adaptor. The armature is comprised of a flanged washer 100 which is held against rotation by one or more pins 101 mounted in adaptor 59b and extending into a slot 102 in washer 100. A conical friction surface 103 is provided in washer 100 which cooperates with a conical surface 104 in a sleeve 105 keyed to rotate with shaft 17b. A spring 106 separate conical surfaces 103 and 104 when the brake is deenergized.

It is understood that the modifications shown in Figs. 5 and 6 may be connected electrically in the circuit shown in Fig. 7 in exactly the same manner as brake 47.

It is understood that the foregoing description is merely illustrative of preferred embodiments of this invention and that the scope of the invention therefore is not to be limited thereto but is to be determined by the appended claims.

I claim:

1. A transmission comprising a driving member, a driven member, an intermediate member, one-way clutching means connecting the intermediate member to the driving and driven members for a drive from the driving member to the driven member through the clutching means and intermediate member and allowing the intermediate member to float when the driving member ceases to drive, a speed changing mechanism for connecting the intermediate member to the driven member, means responsive to a speed differential between the intermediate and driven members for rendering the speed changing meshanism effective, and means for accelerating the establishment of the speed differential.

2. A transmission comprising a driving member, a driven member, an intermediate member, one-way clutching means connecting the intermediate member to the driving and driven members for a drive from the driving member to the driven member through the clutching means and intermediate member and allowing the intermediate member to float when the driving member ceases to drive, a speed changing mechanism for connecting the intermediate member to the driven member, means responsive to a speed differential between the intermediate and driven members for rendering the speed changing mechanism effective, and means acting directly upon the intermediate member for accelerating the establishment of the speed differential.

3. A transmission comprising a driving member, a driven member, an intermediate member, releasable means connecting the intermediate member to the driving and driven members, such that when the driving member ceases to drive the intermediate member will float, speed changing mechanism for connecting the intermediate member to the driven shaft, means responsive to a predetermined speed differential between the intermediate and driven members for rendering the speed changing mechanism effective, means for accelerating the establishment of the speed differential, and means controlled by the speed differential responsive means for rendering the accelerating means ineffective.

4. A transmission comprising a driving member, a driven member, an intermediate member, releasable means connecting the intermediate member to the driving and driven members such that when the driving member ceases to drive the intermediate member will float, a planetary transmission for connecting the intermediate member to the driven shaft, said transmission having an element which is adapted to be held against rotation to effect a speed ratio change between the intermediate and driven members, means responsive to a speed differential between the intermediate and driven members for holding the element against rotation, and means for accelerating the establishment of the speed differential to decrease the amount of time required to arrest the rotation of said element.

5. A transmission comprising a driving member, a driven member, an intermediate member, releasable means for connecting the intermediate member to the driving and driven members such that when the driving member ceases to drive, the intermediate member will float, a planetary transmission comprising a carrier connected to the intermediate member, a ring gear adapted to be connected to the driven member and a sun gear, means for arresting the rotation of the sun gear to drive the driven member at a greater speed than the intermediate member, said means comprising a slotted element drivingly secured to the sun gear, a radially slidable pawl adapted to engage the slotted element, the end of said pawl being chamfered to prevent engagement of the pawl with a slot except upon a reversal of driving relations therebetween, and a brake on the intermediate member for slowing down the carrier in order to accelerate the reversal of driving relations between the pawl and slotted element.

6. A transmission comprising a driving member, a driven member, an intermediate member, an overrunning clutch connecting the intermediate member to the driving member, an overrunning clutch connecting the intermediate member to the driven member, said overrunning clutches providing a drive from the driving member to the driven member through the clutches and the intermediate member and allowing the intermediate member to float when the driving member ceases to drive, a speed changing mechanism for connecting the intermediate member to the driven member, means responsive to a speed differential between the intermediate and driven members for rendering the speed changing mechanism effective, and means acting directly upon the intermediate member for accelerating the establishment of the speed differential to decrease the amount of time required to render the speed changing mechanism effective.

7. A transmission comprising a driving member, a driven member, an intermediate member, releasable means connecting the intermediate member to the driving and driven members such that when the driving member ceases to drive, the intermediate member will float, a speed changing mechanism for connecting the intermediate member to the driven member, said speed changing mechanism having a rotatable element the rotation of which is adapted to be arrested to provide a different speed ratio, radially slidable means for arresting the rotation of said rotatable element, said radially slidable means being responsive to a speed differential between the intermediate and driven members, means acting directly upon the intermediate member for accelerating the establishment of the speed differential, and means controlled by movement of said radially movable member to operative position to render the accelerating means ineffective.

8. A transmission comprising a driving member, a driven member, an intermediate member, releasable means connecting the intermediate member to the driving and driven members such that when the driving member ceases to drive the intermediate member will float, a speed changing mechanism for connecting the intermediate member to the driven member, said speed changing mechanism including a rotatable element the rotation of which is adapted to be arrested to provide a different speed ratio, radially slidable means responsive to the speed differential between the intermediate and driven members for arresting the rotation of said rotatable element, an electrically operated brake on the intermediate member for accelerating the establishment of the speed differential, and a switch operated by the radially movable means for breaking the circuit to the electric brake to render said brake inoperative after the radially slidable means has become operative.

9. A transmission comprising a driving member, a driven member, an intermediate member, releasable means connecting the intermediate member to the driving and driven members, such that when the driving member ceases to drive, the intermediate member will float, speed changing mechanism for connecting the intermediate member to the driven member, means responsive to a speed differential between the intermediate and driven members for rendering the speed changing mechanism effective, and brake means for accelerating the establishment of the speed differential, said brake means comprising an electromagnet surrounding the intermediate member and fixed against rotation relative thereto, an armature drivingly associated with the intermediate member, means for energizing the electromagnet and means controlled by the speed differential responsive means for deenergizing the magnet.

10. A transmission comprising a driving member, a driven member, an intermediate member, releasable means connecting the intermediate member to the driving and driven member, such that when the driving member ceases to drive the intermediate member will float, speed changing mechanism for connecting the intermediate member to the driven member, means responsive to a speed differential between the intermediate and driven members for rendering the speed changing mechanism effective, a speed controlled switch, and brake means for accelerating the establishment of the speed differential, said brake means comprising an electromagnet surrounding the intermediate member and fixed against rotation relative thereto, an armature drivingly associated with the intermediate member, means for energizing the electromagnet, means controlled by the speed differential responsive means for deenergizing the magnet, and means controlled by the speed-controlled switch for controlling the energization of the electromagnet.

11. A transmission as described in claim 9, said armature being made of steel, and an annulus non-rotatably secured to the electromagnet and provided with a friction facing for preventing scoring of the armature.

12. A transmission comprising a driving shaft, a driven shaft, an intermediate shaft, means including an overrunning clutch for connecting the intermediate shaft to the driving shaft, an overrunning clutch connecting the intermediate shaft to the driven shaft, planetary gearing adapted to be connected between the intermediate and driven shafts, said gearing comprising a planetary gear connected to the intermediate shaft, a ring gear connected to the driven shaft, and a sun gear, means for arresting rotation of the sun gear to provide an overdrive between the intermediate and driven shaft, said last mentioned means comprising a slotted member drivingly associated with the sun gear and a rotationally fixed radially slidable pawl adapted to engage said slotted member, speed responsive means for controlling the radially slidable pawl, a brake on the intermediate shaft for decelerating the carrier and thereby the sun gear, said decelerating means being speed controlled, and means on the pawl for rendering the decelerating means ineffective when the pawl is operative to arrest the rotation of the sun gear.

13. A transmission as described in claim 12, said means for controlling the pawl and said means for decelerating the intermediate shaft comprising electromagnets and means interconnecting the electromagnets and speed controlled means such that the circuit through the decelerating means is broken either when the pawl is operative, or when the speed-controlled means is rotating below a predetermined speed.

14. A transmission comprising a driving shaft, a driven shaft, an intermediate shaft, means including an overrunning clutch connecting the intermediate shaft to the driving shaft, an overrunning clutch connecting the intermediate shaft to the driven shaft for direct drive, planetary gearing for establishing an overdrive between the intermediate shaft and driven shaft, said gearing including means for arresting the rotation of the sun gear, a brake on the intermediate shaft likewise effective to arrest the rotation of the sun gear, speed control means for controlling the operation of the brake and the sun gear arresting means, and means on said sun gear arresting means for rendering the brake means ineffective when the rotation of the sun gear has been arrested.

15. A transmission comprising a drive shaft, a driven shaft, an intermediate shaft, one-way clutching means connecting the intermediate shaft to the drive and driven shafts for a drive from the drive shaft to the driven shaft through the clutching means and intermediate shaft and allowing the intermediate shaft to float when the drive shaft ceases to drive, change speed gearing connectible between the intermediate shaft and the driven shaft, positively interengageable elements for effecting a speed ratio change in the change speed gearing, said elements being engageable upon a reversal of direction of rotation of one of the elements with respect to another of said elements, said one of the elements being associated with the intermediate shaft, and means for decelerating the intermediate shaft to facilitate the engagement of said elements.

16. A transmission comprising a driving member, a driven member, an intermediate member, releasable means connecting the intermediate member to the driving and driven members, such that when the driving member ceases to drive, the intermediate member will float, other means operable to connect the intermediate member to the driving member, said other means when operated serving to establish a fixed speed relation between the intermediate and driving members such that the intermediate member will not float, a speed changing mechanism for connecting the intermediate member to the driven member, means responsive to a speed differential between the intermediate and driven members, for rendering the speed changing mechanism effective, means for accelerating the establishment of the speed differential, and means controlled by operation of the said other connecting means for rendering the accelerating means ineffective.

17. A transmission as described in claim 16, said transmission including a control member responsive to the speed of the driven member and adapted to render the accelerating means ineffective except above a predetermined speed of the driven member.

18. A transmission comprising a driving member, a driven member, an intermediate member, one-way clutching means connecting the intermediate member to the driving and driven members for a drive from the driving member to the driven member through the clutching means and intermediate member and allowing the intermediate member to float when the driving member ceases to drive, speed changing mechanism for connecting the intermediate member to the driven member, means responsive to a speed differential between the intermediate and driven members for rendering the speed changing mechanism effective, and brake means for accelerating the establishment of the speed differential, said brake means comprising an electromagnet surrounding the intermediate member and fixed against rotation relative thereto, and an armature drivingly associated with the intermediate member.

19. A transmission comprising a driving member, a driven member, an intermediate member, releasable means connecting the intermediate member to the driving and driven members, such that when the driving member ceases to drive, the intermediate member will float, speed changing mechanism for connecting the intermediate member to the driven member, means responsive to a speed differential between the intermediate and driven members for rendering the speed changing mechanism effective, brake means for accelerating the establishment of the speed differential, said brake means comprising an electromagnet surrounding the intermediate member and fixed against rotation relative thereto, and an armature drivingly associated with the intermediate member, and a friction ring interposed between the armature and the electromagnet, said ring comprising a plurality of coplanar coaxial rings, one of said rings being non-rotatably fixed in the electromagnet, and a friction ring bonded to the coplanar rings.

20. A transmission comprising a driving member, a driven member, an intermediate member, releasable means connecting the intermediate member to the driving and driven members, such that when the driving member ceases to drive, the intermediate member will float, speed changing mechanism for connecting the intermediate member to the driven member, means responsive to a speed differential between the intermediate and driven members for rendering the speed changing mechanism effective, and brake means for accelerating the establishment of the speed differential, said brake means comprising an electromagnet surrounding the intermediate member and fixed against rotation relative thereto, and an armature drivingly associated with the intermediate member, said electromagnet comprising a coil coaxial with the intermediate member, a non-rotatable stamping for supporting the coil, a fixed plate having a conical peripheral surface, and said armature having a complementary conical surface adapted to engage the first-mentioned conical surface and being fixed to and rotatable with the intermediate member.

21. A transmission comprising a driving member, a driven member, an intermediate member, releasable means connecting the intermediate member to the driving and driven members, such that when the driving member ceases to drive, the intermediate member will float, speed changing mechanism for connecting the intermediate member to the driven member, means responsive to a speed differential between the intermediate and driven members for rendering the speed changing mechanism effective, and brake means for accelerating the establishment of the speed differential, said brake means comprising an electromagnet surrounding the intermediate member and fixed against rotation relative thereto, and an armature drivingly associated with the intermediate member, said electromagnet having a conical friction surface and said armature comprising a stamping surrounding the electromagnet and having a conical friction surface engageable with the first-mentioned fixed surface, and resilient means for separating the friction surfaces.

22. A transmission comprising a driving member, a driven member, an intermediate member, releasable means connecting the intermediate member to the driving and driven members, such that when the driving member ceases to drive, the intermediate member will float, speed changing mechanism for connecting the intermediate member to the driven member, means responsive to a speed differential between the intermediate and driven members for rendering the speed changing mechanism effective, and brake means for accelerating the establishment of the speed differential, said brake means comprising an electromagnet surrounding the intermediate member and fixed against rotation relative thereto, an axially slidable rotationally fixed armature associated with the electromagnet, said armature being adapted to be received within the electromagnet and having a conical friction surface, and means fixed to the intermediate member and having a conical friction surface which is adapted to cooperate with the friction surface on the armature.

GEORGE E. FLINN.